United States Patent [19]
Harada et al.

[11] Patent Number: 4,948,571
[45] Date of Patent: Aug. 14, 1990

[54] PROCESS FOR PURIFYING NITROGEN TRIFLUORIDE GAS

[75] Inventors: Isao Harada; Hisashi Hokonohara; Toshiaki Yamaguchi, all of Yamaguchi, Japan

[73] Assignee: Mitsui Toatsu Chemicals, Inc., Tokyo, Japan

[21] Appl. No.: 334,529

[22] Filed: Apr. 7, 1989

[30] Foreign Application Priority Data

Apr. 11, 1988 [JP] Japan .................................. 63-87209
Apr. 12, 1988 [JP] Japan .................................. 63-90032

[51] Int. Cl.$^5$ .......................... C01B 7/00; C01B 21/06
[52] U.S. Cl. .................................... 423/240; 422/241; 423/406
[58] Field of Search ................. 423/406, 240 R, 240 S; 422/241

[56] References Cited

U.S. PATENT DOCUMENTS

| | | | |
|---|---|---|---|
| 4,156,598 | 5/1979 | Woytek et al. | 423/406 |
| 4,193,976 | 3/1980 | Lileck et al. | 423/406 |
| 4,399,113 | 8/1983 | Tosaka et al. | 423/240 R |

FOREIGN PATENT DOCUMENTS

| | | | |
|---|---|---|---|
| 470657 | 1/1951 | Canada | 423/240 S |
| 614669 | 2/1961 | Canada | 423/406 |
| 59-15081 | 3/1984 | Japan | |
| 151608 | 6/1988 | Japan | 423/240 S |
| 700191 | 12/1979 | U.S.S.R. | 422/241 |
| 691733 | 5/1953 | United Kingdom | 422/241 |

OTHER PUBLICATIONS

Massonne, J., Chem. Ing. Techn., 41, 12, (1969), p. 695.
Chem. Eng., 84, (1977), p. 116.

Primary Examiner—Robert L. Stoll
Assistant Examiner—Wayne A. Langel
Attorney, Agent, or Firm—Fisher, Christen & Sabol

[57] ABSTRACT

A process of the present invention can effectively decompose, particularly, dinitrogen difluoride present in a nitrogen trifluoride gas to remove it from the gas.

This process for purifying the nitrogen trifluoride gas is characterized by comprising the step of heating the nitrogen trifluoride gas containing at least dinitrogen difluoride as an impurity at a temperature of 150° C. to 600° C. in a metallic vessel the inner wall of which is lined with a solid fluoride, or in a packing layer of the solid fluoride in the vessel.

8 Claims, 1 Drawing Sheet

PROCESS FOR PURIFYING NITROGEN TRIFLUORIDE GAS

BACKGROUND OF THE INVENTION (1) Field of the Invention

The present invention relates to a process for purifying a nitrogen trifluoride gas. More specifically, it relates to a process for particularly removing dinitrogen difluoride from a nitrogen trifluoride gas.

(2) Description of the Prior Art

In recent years, a nitrogen trifluoride ($NF_3$) gas is noticed as a dry etching agent for semiconductors and as a cleaning gas for CVD reactors, but the nitrogen trifluoride gas for use in these use purposes is required to have the highest possible purity.

The nitrogen trifluoride ($NF_3$) gas can be prepared by a variety of methods, but the gas obtained through any method contains relatively large amounts of impurities such as nitrous oxide ($N_2O$), carbon dioxide ($CO_2$) and dinitrogen difluoride ($N_2F_2$). Therefore, in order to obtain the high-purity $NF_3$ gas for the above-mentioned uses, purification is necessary.

As the purification process for removing these impurities from the $NF_3$ gas, a process for adsorbing and removing the impurities by the use of an adsorbent such as zeolite is well known, and this process is considered to be most effective and simple (Chem. Eng. 84, p. 116, 1977). However, with regard to the purification process utilizing the adsorption, the following inconveniences appear in the case that $N_2F_2$ is present in the $NF_3$ gas. That is, (1) When $N_2F_2$ is present, the ability to adsorb the other impurities such as $CO_2$ and $N_2O$ deteriorates extremely.

(2) When $N_2F_2$ is present, $NF_3$ is also liable to be adsorbed by the adsorbent, which leads to the loss of the $NF_3$ gas.

(3) $N_2F_2$ which is adsorbed by the adsorbent and concentrated thereon is easily decomposed to generate heat, and in a noticeable case, explosion takes place.

In consequence, in the case that there is employed the process for adsorbing the impurities in the $NF_3$ gas by using an adsorbent such as zeolite to remove them therefrom, it is necessary to previously eliminate $N_2F_2$ therefrom.

As the process for removing $N_2F_2$ from the $NF_3$ gas, there has been heretofore known the process in which $N_2F_2$ is reacted with an aqueous solution of KI, HI, $Na_2S$, $Na_2S_2O_3$, $Na_2SO_3$ or the like in a reaction vessel (J. Massonne, "Chem. Ing. Techn.", 41, (12), p. 695, 1969). However, this process takes a relatively long period of time to perfectly remove $N_2F_2$, and thus not only the rather large reaction vessel but also a great deal of the agent is required.

Furthermore, another process for the removal of $N_2F_2$ is known in which the $NF_3$ gas containing $N_2F_2$ is passed through a catalytic packing layer with which a reaction vessel is packed and which comprises heated metallic pieces or nets of stainless steel, carbon steel, copper, aluminum, zinc, lead, nickel, iron or the like, so that the reaction and decomposition of the gas take place on the surfaces of the metallic pieces or nets under the catalytic function of these metallic pieces or nets (Japanese Patent Publication No. 15081/1984). However, according to investigations by the present inventors, $N_2F_2$ is reacted with the metallic pieces or nets in order to easily produce metallic fluorides on the surfaces thereof. In many cases, the thus produced metallic fluorides separate in the form of a powder from the surfaces of the metallic pieces or nets, and the packing layer and pipes of a purification apparatus are clogged with the powder disadvantageously.

In addition, the present inventors have conducted researches and have elucidated the following fact. When nickel is used as the metallic pieces, a film of fluorides is formed on the surfaces of the nickel pieces, but this film is relatively difficult to separate from the nickel surfaces. Therefore, the pipes can be prevented from clogging. However, the nickel prices covered with the fluoride film cannot react with $N_2F_2$ any more, so that needless to say, the catalytic activity of the nickel pieces is lost. For this reason, it is necessary that operation is periodically stopped to change the inactive pieces for the new nickel pieces, which increases cost noticeably in cooperation with the use of expensive nickel.

Moreover, when the temperature of the packing layer comprising the metallic pieces is elevated up to, e.g., a temperature of 200° C. or more for the purpose of heightening the removal efficiency of $N_2F_2$, a perceptible amount of $NF_3$ which is the main component of the gas also reacts with the metallic pieces and decomposes, so that the yield of $NF_3$ lowers correspondingly.

SUMMARY OF THE INVENTION

An object of the present invention is to provide a process by which dinitrogen difluoride of an impurity contained in a nitrogen trifluoride gas is effectively decompose and removed therefrom safely and economically without losing nitrogen trifluoride.

The first aspect of the present invention is directed to a process for purifying a nitrogen trifluoride gas which comprises the step of heating the nitrogen trifluoride gas containing at least dinitrogen difluoride as an impurity at a temperature of 150° to 600° C. in a metallic vessel the inner wall of which is lined with a solid fluoride, and in this case, the shape of the metallic vessel is cylindrical.

The second aspect of the present invention is directed to a process for purifying a nitrogen trifluoride gas which comprises the steps of packing, with a solid fluoride, a metallic vessel, preferably a cylindrical vessel, the inner wall of which is lined with a solid fluoride, in order to form a packing layer in the vessel, and then heating the nitrogen trifluoride gas containing at least dinitrogen difluoride as an impurity at a temperature of 150° to 600° C. in the packing layer of the solid fluoride.

BRIEF DESCRIPTION OF DRAWINGS

The sole FIGURE of the Drawing represents an apparatus for carrying out the process of the invention.

DETAILED DESCRIPTION OF THE INVENTION

Figure 1:
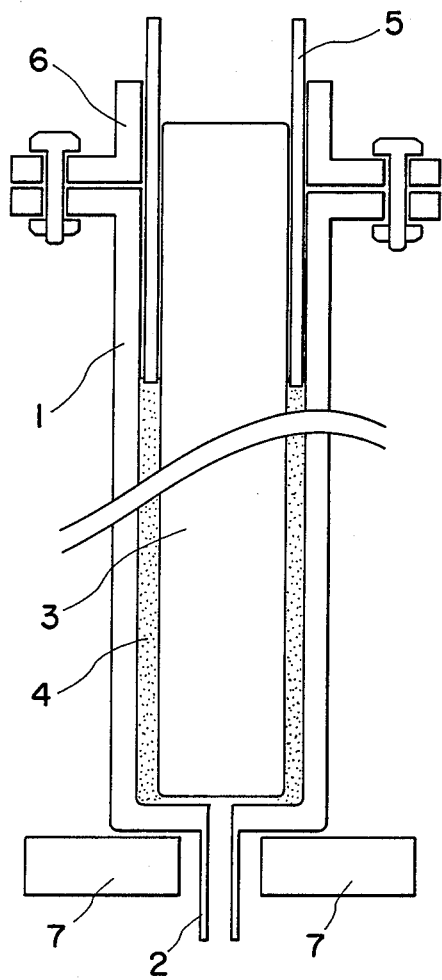

The present inventors have intensely investigated a process for the removal of $N_2F_2$ contained in a $NF_3$ gas, and unexpectedly they have found that $N_2F_2$ effectively decomposes into a nitrogen ($N_2$) gas and a fluorine ($F_2$) gas only by heating the $NF_3$ gas containing $N_2F_2$. In addition, it has been also found that if the heating operation is carried out in a specific vessel, $NF_3$ of the main component does not decompose conveniently even when heated at a temperature of 200° C. or more, with the result that $N_2F_2$ can be removed from the $NF_3$ gas effectively, safely and economically. The present invention has been achieved on these knowledges found by the present inventors.

For the first place, reference will be made to an equipment such as a vessel used in the present invention. Legal regulations regarding high-pressure gases are applied to the $NF_3$ gas. Therefore, the manufacturing equipment for the $NF_3$ gas must satisfy the high-pressure gas regulations, and it is necessary that the outside of the manufacturing equipment is made of a metal. Accordingly, the vessel used in the present invention, preferably the cylindrical vessel must be made of a metal such as iron or stainless steel. In the following description, the vessel having a cylindrical shape which can be most easily manufactured will be typified, but it should be comprehended that the shape of the vessel used in the present invention is not limited to the cylindrical form, and as is apparent from the description of claim 1, the vessel for the present invention can take a shape such as rectangle, box, cone or double pipe, in addition to the cylindrical shape.

The metallic cylindrical vessel (hereinafter referred to simply as "cylindrical vessel") used in the present invention is preferably equipped with an inlet pipe and outlet pipe for the $NF_3$ gas, and it is desirable that the inner wall of the cylindrical vessel is lined with a solid fluoride.

In the present invention, the $NF_3$ gas is heated up to about 600° C. at a maximum in the cylindrical vessel, and thus the solid fluoride used to line the inner wall preferably has a melting point of more than 600° C. Examples of the solid fluoride include metallic fluorides of the group IA of the periodic table such as lithium fluoride (LiF), sodium fluoride (NaF), potassium fluoride (KF), rubidium fluoride (RbF) and cesium fluoride (CsF); metallic fluorides of the group IIA of the periodic table such as beryllium fluoride ($BeF_2$), magnesium fluoride ($MgF_2$), calcium fluoride ($CaF_2$), strontium fluoride ($SrF_2$) and barium fluoride ($BaF_2$); metallic fluorides of the group IIIA of the periodic table such as aluminum fluoride ($AlF_3$), gallium fluoride ($GaF_3$) and indium fluoride ($InF_3$); and a double salt such as aluminum sodium fluoride ($Na_3AlF_6$). They may be used in the form of a mixture.

In addition to the above-mentioned fluorides, a solid fluoride having a melting point of 600° C. or less can be also used in the present invention, so long as it has a melting point of about 350° C. or more. In this case, the present invention can be performed at a temperature below the melting point of this solid fluoride without any trouble.

In the present invention, the shape of the vessel in which $NF_3$ is heated is not limited to the cylindrical form, but the cylindrical vessel is preferable from the viewpoints of the easy manufacture of the vessel itself, the easy lining treatment of the solid fluoride, the high strength of a lining layer and the prevention of cracks in the lining layer. The thickness of the lining layer is not particularly limited, but when the lining layer is extremely thin, it is technically difficult to perfectly form the lining layer on the inner wall of the cylindrical vessel, so that the metallic surface of the cylindrical vessel is apt to be partially exposed. Inversely, when the lining layer is too thick, heat transfer efficiency deteriorates at the time of heating and heat energy is lost inconveniently, since in the present invention, the cylindrical vessel is heated by a heater or the like from the outside. Accordingly, the thickness of the lining layer is in the range of about 1 to 5 mm.

In the case that the solid fluoride having a relatively low melting point, for example, the fluoride of an element of the group IA of the periodic table is used, lining the solid fluoride on the inner wall of the cylindrical vessel can be achieved by a calcination method.

That is, as shown in FIG. 1, an inside cylinder 3 having a little smaller outer diameter than the inner diameter of a cylindrical vessel 1 is coaxially inserted into the cylindrical vessel 1. Afterward, the space between the cylindrical vessel 1 and the inside cylinder 3 is packed with a powdery solid fluoride 4, and the latter 4 is then pressed and molded by applying load to a pressing pipe 5. The operation of packing with the solid fluoride 4 and press molding is repeated so as to form a press-molded layer of the solid fluoride 4 on the whole inner wall surface of the cylindrical vessel 1. Afterward, the inside cylinder 3 is drawn up slowly, and the cylindrical vessel 1 is heated gradually up to a softening point of the solid fluoride in a atmosphere of an inert gas such as nitrogen ($N_2$) or helium (He), and it is then cooled slowly, whereby the inner wall of the cylindrical vessel 1 can be easily lined with the solid fluoride 4.

In this case, if the water content in the solid fluoride is adjusted to 2 to 3% by weight, the press molding of the solid layer can be accomplished with ease. This fact can be also applied to the lining technique by a high-pressure press method which will be described hereinafter.

It is preferred that the surface of the inside cylinder 3 is previously coated with a lubricant, since the inside cylinder 3 can be easily drawn up after the press-molded layer of the solid fluoride 4 has been formed on the surface of the cylindrical vessel 1.

If water is present in the solid fluoride, this water reacts with $NF_3$ when the $NF_3$ gas is passed through the vessel, so that nitrogen oxide (NO) is produced unpreferably. However, the water contained in the solid fluoride layer is evaporated out and removed therefrom together with the lubricant adhering to the solid fluoride layer, when this layer is subjected to the heating step.

In the case that the inner wall of the cylindrical vessel is lined with the solid fluoride having a relatively high melting point, the high-pressure press method is suitable. That is, in a similar manner as in the case of the calcination method described above, the space between the cylindrical vessel 1 and the inside cylinder 3 is packed with the solid fluoride 4 as in FIG. 1, and afterward the solid fluoride 4 is press molded by applying load to the pressing pipe 5. This procedure is repeated to form the solid fluoride lining layer on the whole inner wall surface of the cylindrical vessel 1, and the inside cylinder 3 is then drawn up slowly.

In this case, in order to form the firm and tough lining layer, it is preferred that when the layer is press molded, the load of the pressing pipe 5 is 2 t/cm$^2$ or more. Furthermore, if being previously coated with a lubricant as in the case of the calcination method, the inside cylinder 3 can be easily drawn up after the formation of the solid fluoride lining layer on the inner surface of the cylindrical vessel 1. In this case, however, the used lubricant must be evaporated out by heating or the like after the formation of the solid fluoride lining layer.

In the present invention, another method of lining the inner wall of the cylindrical vessel with the solid fluoride can be employed which comprises pouring the melted solid fluoride into the space between the cylindrical vessel 1 and the inside cylinder 3 shown in FIG. 1, and then cooling and thereby solidifying the fluoride.

According to the present invention, the $NF_3$ gas to be purified is heated and decomposed in the cylindrical vessel the inner surface of which is thus lined with the solid fluoride. Preferably, the $NF_3$ gas is heated as follows: The cylindrical vessel having the inner surface lined with the solid fluoride is previously prepared, and it is then heated. Afterward, the $NF_3$ gas containing $N_2F_2$ is passed through the hot cylindrical vessel. Heating the cylindrical vessel can be easily achieved by heating the outside of the cylindrical vessel by means of a heater or the like.

In the present invention, the heating temperature of the $NF_3$ gas containing $N_2F_2$ is in the range of 150° to 600° C., preferably 250° to 350° C. When the heating temperature is less than 150° C. or less, $N_2F_2$ can scarcely be decomposed and removed therefrom. Inversely, when it is in excess of 600° C., $N_2F_2$ can be removed substantially perfectly, but cracks tend to occur inconveniently in the lining layer of the cylindrical vessel owing to a difference between thermal expansion coefficients. In addition, thermal energy is lost uneconomically. Since the decomposition rate of $N_2F_2$ at the above-mentioned heating temperature is very high, the residence time (ratio of the volume of the reaction vessel to the volume rate of the gas) of the $NF_3$ gas in the vessel may be short, but it is usually in the range of about 5 to 1,000 seconds.

In the present invention, the $NF_3$ gas may be fed singly to the cylindrical vessel, but it may be diluted with an inert gas such as $N_2$ or He prior to the feed thereto. Moreover, the pressure of the $NF_3$ gas is not particularly limited but is usually in the range of 0 to 5 kg/cm$^2$.G because of easy operation.

In the second aspect of the present invention, the metallic vessel the inner wall of which is lined with the solid fluoride is packed with the solid fluoride to form a packing layer of the solid fluoride, and the nitrogen trifluoride gas containing dinitrogen difluoride is heated at a temperature of 150° to 600° C. in the packing layer.

Now, reference will be made to the solid fluoride with which the cylindrical vessel is packed.

The solid fluoride used in the present invention suitably has a melting point of 600° C. or more in common with the solid fluoride used to line the inner wall of the cylindrical vessel, but the solid fluoride having a melting point of less than 600° C. is also usable, so long as it remains in a solid state at a heating temperature of $NF_3$. For example, when the solid fluoride having a melting point of about 350° C. or more is used, the present invention can be performed at a temperature below this melting point without any trouble.

Therefore, the preferable solid fluorides are those which are hereinbefore exemplified as the solid fluorides to line the inner wall of the cylindrical vessel.

The shape of the solid fluoride with which the cylindrical vessel is packed is preferably granular, and the size of the granules is not particularly limited and depends upon the size of the reaction vessel and ease of handling. Moreover, when being in the state of powder, the solid fluoride can be tableted for preferable utilization by means of a tableting machine.

If the solid fluoride contains water, $HF_3$ reacts with the water therein when the $NF_3$ gas is brought into contact with the solid fluoride, so that nitrogen monoxide (NO) is produced. Therefore, it is desirable that the solid fluoride is beforehand dried to remove water therefrom.

In a preferable embodiment of the second aspect regarding the present invention, the cylindrical vessel having the inner surface lined with the solid fluoride is packed with the solid fluoride, and it is then heated. Afterward, the $NF_3$ gas containing $N_2F_2$ is passed through the hot cylindrical vessel. Heating the cylindrical vessel can be easily achieved by heating the outside of the cylindrical vessel by means of a heater or the like.

In the second aspect of the present invention, the $NF_3$ gas to be purified is heated and decomposed in the packing layer of the solid fluoride in the cylindrical vessel the inner wall of which is lined with the solid fluoride. The heating of the $NF_3$ gas is preferably achieved as follows: The vessel having the inner surface lined with the solid fluoride is previously prepared, the vessel is then packed with the solid fluoride, afterward the latter is heated, and the $NF_3$ gas containing $N_2F_2$ is then passed through the heated solid fluoride in the cylindrical vessel.

Also in the second aspect of the present invention, the heating temperature of the $NF_3$ gas containing $N_2F_2$ is in the range of 150° to 600° C., preferably 250° to 350° C. When the heating temperature is less than 150° C., $N_2F_2$ can scarcely be decomposed and removed therefrom. Inversely, when it is in excess of 600° C., $N_2F_2$ can be removed substantially perfectly, but cracks tend to occur inconveniently in the lining layer of the cylindrical vessel owing to a difference between thermal expansion coefficients. In addition, thermal energy is lost uneconomically. Since the decomposition rate of $N_2F_2$ at the above-mentioned heating temperature is very high, the residence time (ratio of the volume of the reaction vessel to the volume rate of the gas) of the $NF_3$ gas in the vessel may be short but it is usually in the range of about 5 to 1,000 seconds.

In the present invention, the $NF_3$ gas may be fed singly to the cylindrical vessel, but it may be diluted with an inert gas such as $N_2$ or He. Moreover, the pressure of the $NF_3$ gas is not particularly limited but is usually in the range of 0 to 5 kg/cm$^2$.G for ease of operation.

As described above in detail, the first aspect of the present invention is connected with the very simple process for removing $N_2F_2$ from the $NF_3$ gas which comprises the step of heating the $NF_3$ gas at the specific temperature in the cylindrical vessel the inner wall of which is lined with the solid fluoride.

The second aspect of the present invention is connected with a very simple and extremely economical process which comprises the steps of packing, with the solid fluoride, the cylindrical vessel having the inner wall lined with the solid fluoride in order to form the solid fluoride layer, and then heating the $NF_3$ gas at the specific temperature in the solid fluoride layer. As elucidated in the undermentioned examples, the removal ratio of $N_2F_2$ in the present invention is excellent. Therefore, if the $NF_3$ gas which has been purified by the process of the present invention is further purified by a conventional known purification method, for example, the above-mentioned purification method using an adsorbent such as a zeolite, a high-purity $NF_3$ gas which is desirable as a raw material of a dry etching agent for semiconductors can be easily obtained, as exhibited in Reference Example 1 which will be described hereinafter. This is the remarkable functional effect of the present invention. In the second aspect of the present invention, the above-mentioned vessel is packed with the solid fluoride, and so the removal ratio of $N_2F_2$ is higher than in the case that the $NF_3$ gas is only heated in the vessel. In addition, the process of the present invention permits obtaining the $NF_3$ gas in a high yield substantially without losing $NF_3$, and what is better, the operation of this process is safe.

EXAMPLES

Now, the present invention will be described in detail in reference to examples, but the scope of the present invention should not be restricted to these examples. Incidentally, "percent" and "ppm" in the examples, comparative examples and reference examples are on the basis of volume, unless otherwise specified.

EXAMPLES 1 to 3

An inside cylinder 3 having an outer diameter of 6 mm and a length of 400 mm and coated with stearic acid as a lubricant was coaxially inserted into a stainless steel cylindrical vessel (column) 1 having an inner diameter of 10 mm and a length of 300 mm, as shown in FIG. 1, and the space between the column 1 and the inside cylinder 3 was then packed little by little with a powder 4 in which a lithium fluoride powder of 3% by weight water content was mixed with 5% by weight of a cesium fluoride powder. Afterward, a pressing pipe 5 having an outer diameter of 9.6 mm and an inner diameter of 6.5 mm was inserted into the above space, and a load of 1 t/cm$^2$ was applied to this pressing pipe 5, whereby the mixed powder 4 was press molded. This operation of packing the space with the mixed powder 4 and press molding was repeated to form the press molded layer of the mixed powder 4 on the whole inner wall surface of the column 1, and the inside cylinder 3 was then drawn up slowly.

Next, this column 1 was heated up to a temperature of 850° C. at a temperature rise rate of 200° C./hour under an $N_2$ gas atmosphere in an electric furnace, and this temperature of 850° C. was further retained for 1 hour. Afterward, the column 1 was allowed to stand until ordinary temperature had been reached in the electric furnace, thereby obtaining the column 1 the whole inner wall of which was lined with the solid fluoride layer having a thickness of 2 mm. In FIG. 1, reference numeral 2 is an outlet pipe 6 for an $NF_3$ gas, numeral 6 is an auxiliary cylindrical pipe 7, and numeral 7 is a surface plate.

The $NF_3$ gas containing $N_2F_2$ was then diluted with a substantially equal volume of an He gas and was then passed through the thus obtained column 1 under conditions shown in Table 1. The gas which had been treated through the column 1 was allowed to bubble in a 1% aqueous potassium iodide (KI) solution, and it was then led into a collector bomb cooled with liquid nitrogen, so that the gas was liquefied and collected therein. After the feed of the $NF_3$ gas was stopped, the collector cylinder was evacuated under vacuum to remove the He gas therefrom.

The $NF_3$ gas before the treatment and the $NF_3$ gas in the collector cylinder after the treatment were analyzed by a gas chromatography. The results in Table 1 indicate that the removal ratio of $N_2F_2$ was high and $NF_3$ was scarcely lost.

The reason why in Table 1, the content of the $N_2$ gas was higher in the $NF_3$ gas which had undergone the treatment is considered to be that $N_2F_2$ was decomposed into $N_2$ and $F_2$.

In Example 3, the lining surface on the column 1 was observed after the treatment of the $NF_3$ gas, and it was apparent that any cracks and damages were not present thereon.

TABLE 1

| Example | 1 | 2 | 3 |
|---|---|---|---|
| Conditions for Treatment | | | |
| Temperature (°C.) | 170 | 300 | 600 |
| Flow Rate of $NF_3$ Gas Diluted with He Gas (Nml/min.) | 60 | 60 | 60 |
| Pressure (Torr) | 760 | 760 | 760 |
| Time (hour) | 4 | 4 | 4 |
| Analytical Values of Gas Before Treatment | | | |
| He (%) | 48.7 | 48.7 | 48.7 |
| $N_2$ (%) | 0.5 | 0.5 | 0.5 |
| $NF_3$ (%) | 47.0 | 47.0 | 47.0 |
| $N_2F_2$ (%) | 2.1 | 2.1 | 2.1 |
| Pure $NF_3$ (g) | 21.4 | 21.4 | 21.4 |
| Analytical Values of Gas After Treatment | | | |
| $N_2$ (%) | 1.8 | 2.0 | 2.1 |
| $NF_3$ (%) | 96.0 | 96.1 | 96.3 |
| $N_2F_2$ (ppm) | 40 | 30 | 20 |
| Pure $NF_3$ (g) | 21.0 | 21.0 | 20.9 |
| Loss of $NF_3$ (%) | 2 | 2 | 2 |

EXAMPLES 4 to 6

The same stainless steel column 1 of inner diameter 10 mm and length 300 mm and the same inside cylinder 3 of outer diameter 6 mm and length 400 mm as used in Examples 1 to 3 were employed, and the space between the column 1 and the inside cylinder 3 coated with stearic acid as a lubricant was packed little by little with each solid fluoride powder 4 of 3% by weight water content shown in Table 2, as in Examples 1 to 3. Afterward, a pressing pipe of outer diameter 9.8 mm and inner diameter 6.2 mm was inserted into the above space, and a load of 2 t/cm$^2$ was applied to this pressing pipe 5, whereby the mixed powder 4 was press molded. This operation of packing the space with the mixed powder 4 and press molding was repeated to form the press molded layer of the mixed powder 4 on the whole inner wall surface of the column 1, and the inside cylinder 3 was then drawn up slowly.

Next, this column 1 was heated up to a temperature of 300° C. at a temperature rise rate of 200° C./hour under an $N_2$ gas atmosphere in an electric furnace, and this temperature of 300° C. was further retained for 1 hour. Afterward, the column 1 was allowed to stand until ordinary temperature had been reached in the electric furnace, thereby obtaining the column 1 the whole inner wall of which was lined with the solid fluoride layer having a thickness of 2 mm.

As in Examples 1 to 3, an $NF_3$ gas containing $N_2F_2$ was then diluted with a substantially equal volume of an He gas and was then passed through the thus obtained column 1 under conditions shown in Table 2. The gas which had been treated through the column 1 was allowed to bubble in a 1% KI aqueous solution, and it was then led into a collector bomb cooled with liquid nitrogen, so that the gas was liquefied and collected therein, as in Examples 1 to 3. After the feed of the $NF_3$ gas was stopped, the collector bomb was evacuated under vacuum to remove the He gas therefrom.

The $NF_3$ gas before the treatment and the $NF_3$ gas in the collector cylinder after the treatment were analyzed by a gas chromatography. The results in Table 2 indicate that the removal ratio of $N_2F_2$ was high and $NF_3$ was scarcely lost.

The reason why in Table 2, the content of the $N_2$ gas was higher in the $NF_3$ gas which had undergone the treatment is considered to be that $N_2F_2$ was decomposed into $N_2$ and $F_2$.

The lining surface on the column 1 was observed after the treatment of the $NF_3$ gas, and it was apparent that any cracks and damages were not present thereon.

TABLE 2

| Example | 4 | 5 | 6 |
|---|---|---|---|
| Conditions for Treatment | | | |
| Solid Fluoride | $AlF_3$ | $CaF_2$ | $Na_3AlF_6$ |
| Temperature (°C.) | 300 | 300 | 300 |
| Flow Rate of $NF_3$ Gas Diluted with He Gas (Nml/min.) | 60 | 60 | 60 |
| Pressure (Torr) | 760 | 760 | 760 |
| Time (hour) | 4 | 4 | 4 |
| Analytical Values of Gas Before Treatment | | | |
| He (%) | 48.7 | 48.7 | 48.7 |
| $N_2$ (%) | 0.5 | 0.5 | 0.5 |
| $NF_3$ (%) | 47.0 | 47.0 | 47.0 |
| $N_2F_2$ (%) | 2.1 | 2.1 | 2.1 |
| Pure $NF_3$ (g) | 21.4 | 21.4 | 21.4 |
| Analytical Values of Gas After Treatment | | | |
| $N_2$ (%) | 1.9 | 2.0 | 2.1 |
| $NF_3$ (%) | 96.0 | 96.1 | 96.3 |
| $N_2F_2$ (ppm) | 30 | 25 | 25 |
| Pure $NF_3$ (g) | 20.8 | 20.9 | 20.9 |
| Loss of $NF_3$ (%) | 3 | 2 | 2 |

COMPARATIVE EXAMPLES 1 to 3

Each cylindrical vessel (column) (inner diameter=6 mm and length=300 mm) made of each material shown in Table 3 was used without lining the inner wall of the vessel with a solid fluoride. As in Examples 1 to 3, an $NF_3$ gas containing $N_2F_2$ was diluted with a substantially equal volume of an He gas and was then passed through the thus obtained column 1 under conditions shown in Table 3. The gas which had been treated through the column 1 was allowed to bubble in a 1% KI aqueous solution, and it was then led into a collector bomb cooled with liquid nitrogen, so that the gas was liquefied and collected therein, as in Examples 1 to 3. After the feed of the $NF_3$ gas was stopped, the collector cylinder was evacuated under vacuum to remove the He gas therefrom.

The $NF_3$ gas before the treatment and the $NF_3$ gas in the collector cylinder after the treatment were analyzed by a gas chromatography. The results in Table 3 indicate that $N_2F_2$ could be removed but the yield of $NF_3$ was low.

TABLE 3

| Comp. Example | 1 | 2 | 3 |
|---|---|---|---|
| Conditions for Treatment | | | |
| Material of Column | Iron | Copper | Stainless Steel |
| Temperature (°C.) | 300 | 300 | 300 |
| Flow Rate of $NF_3$ Gas Diluted with He Gas (Nml/min.) | 60 | 60 | 60 |
| Pressure (Torr) | 760 | 760 | 760 |
| Time (hour) | 4 | 4 | 4 |
| Analytical Values of Gas Before Treatment | | | |
| He (%) | 48.7 | 48.7 | 48.7 |
| $N_2$ (%) | 0.4 | 0.4 | 0.4 |
| $NF_3$ (%) | 47.2 | 47.2 | 47.2 |
| $N_2F_2$ (%) | 1.9 | 1.9 | 1.9 |
| Pure $NF_3$ (g) | 21.5 | 21.5 | 21.5 |
| Analytical Values of Gas After Treatment | | | |
| $N_2$ (%) | 4.6 | 4.2 | 3.5 |
| $NF_3$ (%) | 94.1 | 94.4 | 95.0 |
| $N_2F_2$ (ppm) | ≦20 | ≦20 | ≦20 |
| Pure $NF_3$ (g) | 18.0 | 18.0 | 18.5 |
| Loss of $NF_3$ (%) | 16 | 16 | 14 |

REFERENCE EXAMPLE 1

A stainless steel column having an inner diameter of 10 mm and a length of 300 mm was packed with a commercially available zeolite (pore diameter=5Å) (granular product of 24 to 28 mesh) to form a packing layer (thickness=250 mm) therein, and the $N_2F_2$-free $NF_3$ gas obtained in Example 3 was then passed through the zeolite packing layer. With regard to conditions for the treatment, temperature was ordinary temperature (about 20° C.), $NF_3$ gas flow rate was 20 Nml/-minute, and pressure was 760 Torr.

After the treatment, the $NF_3$ gas was analyzed by a gas chromatography. As a result, it was apparent that contents of impurities in the $NF_3$ gas were low, that is, $N_2F_2$ was 20 ppm or less, $N_2O$ was 20 ppm or less, and $CO_2$ was 20 ppm or less. In consequence, it can be understood that if the $NF_3$ gas from which $N_2F_2$ has been previously removed is further purified by the use of a conventional known adsorbent, impurities such as $N_2O$ and $CO_2$ other than $N_2F_2$ can be removed therefrom in an extremely high removal ratio, so that high-purity $NF_3$ can be obtained.

EXAMPLES 7 to 9

An inside cylinder 3 having an outer diameter of 6 mm and a length of 400 mm and coated with stearic acid as a lubricant was coaxially inserted into a stainless steel cylindrical vessel (column) 1 having an inner diameter of 10 mm and a length of 300 mm, as shown in FIG. 1, and the space between the column 1 and the inside cylinder 3 was then packed little by little with a powder 4 in which a lithium fluoride powder of 3% by weight water content was mixed with 5% by weight of a cesium fluoride powder. Afterward, a pressing pipe 5 having an outer diameter of 9.6 mm and an inner diameter of 6.5 mm was inserted into the above space, and a load of 1 t/cm² was applied to this pressing pipe 5, whereby the mixed powder 4 was press molded. This operation of packing the space with the mixed powder 4 and press molding was repeated to form the press molded layer of the mixed powder 4 on the whole inner wall surface of the column 1, and the inside cylinder 3 was then drawn up slowly.

Next, this column 1 was heated up to a temperature of 850° C. at a temperature rise rate of 200° C./hour under an $N_2$ gas atmosphere in an electric furnace, and this temperature of 850° C. was further retained for 1 hour. Afterward, the column 1 was allowed to stand until ordinary temperature had been reached in the electric furnace, thereby obtaining the column 1 the whole inner wall of which was lined with the solid fluoride layer having a thickness of 2 mm. In this case, by the above heating operation, water was removed from lithium fluoride and cesium fluoride, and the lubricant used in the formation of the lining layer was also evaporated out.

Afterward, the column 1 was packed (height of packing layer=250 mm) with calcium fluoride ($CaF_2$) grains of 24 to 32 mesh, and the packing layer was then heated up to a temperature of 200° C. While keeping this temperature, an $N_2$ gas was passed through the packing layer at a flow rate of 100 cc/minute for 1 hour, whereby water was removed from $CaF_2$.

Next, an $NF_3$ gas containing $N_2F_2$ was then diluted with a substantially equal volume of an He gas and was then passed through the thus obtained column 1 having the $CaF_2$ layer under conditions shown in Table 4. The gas which had been treated through the column 1 was allowed to bubble in a 1% aqueous potassium iodide (KI) solution, and it was then led into a collector cylinder cooled with liquid nitrogen, so that the gas was liquefied and collected therein. After the feed of the $NF_3$ gas was stopped, the collector cylinder was evacuated under vacuum to remove the He gas therefrom.

The $NF_3$ gas before the treatment and the $NF_3$ gas in the collector cylinder after the treatment were analyzed by a gas chromatography. The results in Table 4 indicate that the removal ratio of $N_2F_2$ was high and $NF_3$ was scarcely lost.

The reason why in Table 4, the content of the $N_2$ gas was higher in the $NF_3$ gas which had undergone the treatment is considered to be that $N_2F_2$ was decomposed into $N_2$ and $F_2$.

In Example 9, the lining surface on the column 1 was observed after the treatment of the $NF_3$ gas, and it was apparent that any cracks and damages were not present thereon.

TABLE 4

| Example | 7 | 8 | 9 |
|---|---|---|---|
| Conditions for Treatment | | | |
| Temperature (°C.) | 170 | 300 | 600 |
| Flow Rate of $NF_3$ Gas Diluted with He Gas (Nml/min.) | 60 | 60 | 60 |
| Pressure (Torr) | 760 | 760 | 760 |
| Time (hour) | 4 | 4 | 4 |
| Analytical Values of Gas Before Treatment | | | |
| He (%) | 48.7 | 48.7 | 48.7 |
| $N_2$ (%) | 0.5 | 0.5 | 0.5 |
| $NF_3$ (%) | 47.0 | 47.0 | 47.0 |
| $N_2F_2$ (%) | 2.1 | 2.1 | 2.1 |
| Pure $NF_3$ (g) | 21.4 | 21.4 | 21.4 |
| Analytical Values of Gas After Treatment | | | |
| $N_2$ (%) | 1.8 | 2.0 | 2.1 |
| $NF_3$ (%) | 96.0 | 96.1 | 96.3 |
| $N_2F_2$ (ppm) | ≦10 | ≦10 | ≦10 |
| Pure $NF_3$ (g) | 21.0 | 21.0 | 20.8 |
| Loss of $NF_3$ (%) | 2 | 2 | 3 |

EXAMPLES 10 to 12

The same stainless steel column 1 of inner diameter 10 mm and length 300 mm and the same inside cylinder 3 of outer diameter 6 mm and length 400 mm as used in Examples 10 to 12 were employed, and the space between the column 1 and the inside cylinder 3 coated with stearic acid as a lubricant was packed little by little with each solid fluoride powder 4 of 3% by weight water content shown in Table 5. Afterward, a pressing pipe 5 of outer diameter 9.8 mm and inner diameter 6.2 mm was inserted into the above space, and a load of 2 t/cm² was applied to this pressing pipe 5, whereby the mixed powder 4 was press molded. This operation of packing the space with the mixed powder 4 and press molding was repeated to form the lining layer of the mixed powder 4 on the whole inner wall surface of the column 1, and the inside cylinder 3 was then drawn up slowly.

Next, this column 1 was heated up to a temperature of 300° C. at a temperature rise rate of 200° C./hour under an $N_2$ gas atmosphere in an electric furnace, and this temperature of 300° C. was further retained for 1 hour, so that water and stearic acid were evaporated and removed from the solid fluoride layer. Afterward, the column 1 was allowed to stand until ordinary temperature had been reached in the electric furnace, thereby obtaining the column 1 the whole inner wall of which wa lined with the solid fluoride layer having a thickness of 2 mm.

The thus obtained column 1 was then packed with a solid fluoride of 24 to 32 mesh shown in Table 5, the volume of the solid fluoride being the same as in Examples 7 to 9. Afterward, the solid fluoride was dried under the same conditions as in Examples 7 to 9, whereby water was removed therefrom.

As in Examples 7 to 9, an $NF_3$ gas containing $N_2F_2$ was then diluted with a substantially equal volume of an He gas and was then passed through the thus obtained column 1 under conditions shown in Table 5. The gas which had been treated through the column 1 was allowed to bubble in a 1% KI aqueous solution, and it was then led into a collector cylinder cooled with liquid nitrogen, so that the gas was liquefied and collected therein, as in Examples 7 to 9. After the feed of the $NF_3$ gas was stopped, the collector cylinder was evacuated under vacuum to remove the He gas therefrom.

The $NF_3$ gas before the treatment and the $NF_3$ gas in the collector bomb after the treatment were analyzed by a gas chromatography. The results in Table 5 indicate that the removal ratio of $N_2F_2$ was high and $NF_3$ was scarcely lost.

The reason why in Table 5, the content of the $N_2$ gas was higher in the $NF_3$ gas which had undergone the treatment is considered to be that $N_2F_2$ was decomposed into $N_2$ and $F_2$.

The lining surface on the column 1 was observed after the treatment of the $NF_3$ gas, and it was apparent that any cracks and damages were not present thereon.

TABLE 5

| Example | 10 | 11 | 12 |
|---|---|---|---|
| Column | | | |
| Lining Material | $AlF_3$ | $CaF_2$ | $Na_3AlF_6$ |
| Packing Material | NaF | KF | $MgF_2$ |
| Conditions for Treatment | | | |
| Temperature (°C.) | 300 | 300 | 300 |
| Flow Rate of $NF_3$ Gas Diluted with He Gas (Nml/min.) | 60 | 60 | 60 |
| Pressure (Torr) | 760 | 760 | 760 |
| Time (hour) | 4 | 4 | 4 |
| Analytical Values of Gas Before Treatment | | | |
| He (%) | 48.7 | 48.7 | 48.7 |
| $N_2$ (%) | 0.5 | 0.5 | 0.5 |

TABLE 5-continued

| Example | 10 | 11 | 12 |
| --- | --- | --- | --- |
| $NF_3$ (%) | 47.0 | 47.0 | 47.0 |
| $N_2F_2$ (%) | 2.1 | 2.1 | 2.1 |
| Pure $NF_3$ (g) | 21.4 | 21.4 | 21.4 |
| Analytical Values of Gas After Treatment | | | |
| $N_2$ (%) | 2.0 | 2.0 | 2.0 |
| $NF_3$ (%) | 96.1 | 96.1 | 96.3 |
| $N_2F_2$ (ppm) | ≦10 | ≦10 | ≦10 |
| Pure $NF_3$ (g) | 20.9 | 20.8 | 20.9 |
| Loss of $NF_3$ (%) | 2 | 3 | 2 |

COMPARATIVE EXAMPLES 4 to 6

Each cylindrical vessel column) (inner diameter=6 mm and length=300 mm) made of each material shown in Table 6 was used without lining its inner wall with a solid fluoride. This column was packed (height of a packing layer=250 mm) with metallic pieces of 24 to 32 mesh shown in Table 6, and as in Examples 7 to 9, an $NF_3$ gas containing $N_2F_2$ was diluted with a substantially equal volume of an He gas and was then passed through the packing layer in the column 1 under conditions shown in Table 6. The gas which had been treated through the column 1 was allowed to bubble in a 1% aqueous KI solution, and it was then led into a collector cylinder cooled with liquid nitrogen, so that the gas was liquefied and collected therein, as in Examples 7 to 9. After the feed of the $NF_3$ gas was stopped, the collector cylinder was evacuated under vacuum to remove the He gas therefrom.

The $NF_3$ gas before the treatment and the $NF_3$ gas in the collector cylinder after the treatment were analyzed by a gas chromatography. The results in Table 6 indicate that $N_2F_2$ could be removed but the yield of $NF_3$ was low.

TABLE 6

| Comp. Example | 4 | 5 | 6 |
| --- | --- | --- | --- |
| Conditions for Treatment | | | |
| Material of Column | Stainless Steel | Stainless Steel | Nickel |
| Packing Metallic Pieces | Iron | Aluminum | Nickel |
| Temperature (°C.) | 300 | 300 | 300 |
| Flow Rate of $NF_3$ Gas Diluted with He Gas (Nml/min.) | 60 | 60 | 60 |
| Pressure (Torr) | 760 | 760 | 760 |
| Time (hour) | 4 | 4 | 4 |
| Analytical Values of Gas Before Treatment | | | |
| He (%) | 48.5 | 48.5 | 48.5 |
| $N_2$ (%) | 0.4 | 0.4 | 0.4 |
| $NF_3$ (%) | 47.3 | 47.3 | 47.3 |
| $N_2F_2$ (%) | 1.9 | 1.9 | 1.9 |
| Pure $NF_3$ (g) | 21.6 | 21.6 | 21.6 |
| Analytical Values of Gas After Treatment | | | |
| $N_2$ (%) | 5.4 | 5.2 | 4.5 |
| $NF_3$ (%) | 93.4 | 93.6 | 94.0 |
| $N_2F_2$ (ppm) | ≦10 | ≦10 | ≦10 |
| Pure $NF_3$ (g) | 17.0 | 17.0 | 17.4 |
| Loss of $NF_3$ (%) | 21 | 21 | 19 |

REFERENCE EXAMPLE 2

A stainless steel cylindrical vessel (column) having an inner diameter of 10 mm and a length of 300 mm was packed with a commercially available zeolite (pore diameter=5Å) (granular product of 24 to 28 mesh) to form a packing layer (thickness=250 mm) therein, and the $N_2F_2$-free $NF_3$ gas obtained in Example 9 was then passed through the zeolite packing layer. With regard to conditions for the treatment, temperature was ordinary temperature (about 20° C.), the $NF_3$ gas flow rate was 20 Nml/minute, and pressure was 760 Torr.

After the treatment, the $NF_3$ gas was analyzed by a gas chromatography. As a result, it was apparent that contents of impurities in the $NF_3$ gas were low, i.e., $N_2F_2$ was 10 ppm or less, $N_2O$ was 10 ppm or less, and $CO_2$ was 10 ppm or less. In consequence, it can be understood that if the $NF_3$ gas from which $N_2F_2$ has been previously removed is purified by the use of a conventional known adsorbent, impurities such as $N_2O$ and $CO_2$ other than $N_2F_2$ can be removed therefrom in an extremely high removal ratio, so that high-purity $NF_3$ can be obtained.

What is claimed is:

1. A process for purifying a nitrogen trifluoride gas, comprising the step of heating said nitrogen trifluoride gas containing at least dinitrogen difluoride as an impurity at a temperature of 150° to 600° C. in a metallic vessel, the whole inner wall of the metallic vessel having been previously lined with a compressed mold, a sintered mold or a fused mold of a solid fluoride which is at least one component selected from the group consisting of fluorides of metals in groups IA, IIA and IIIA of the periodic table, mixtures thereof and double salts thereof, the compressed mold, the sintered mold or the fused molding having a thickness of 1 to 5 mm.

2. The process for purifying a nitrogen trifluoride gas according to claim 1 wherein and solid fluoride is at least one compound selected from the group consisting of lithium fluoride (LiF), sodium fluoride (NaF), potassium fluoride (KF), rubidium fluoride (RbF), cesium fluoride (CsF), beryllium fluoride ($BeF_2$), magnesium fluoride ($MgF_2$), calcium fluoride ($CaF_2$), strontium fluoride ($SrF_2$), barium fluoride ($GaF_3$), indium fluoride ($InF_3$) and aluminum sodium fluoride ($Na_3AlF_6$).

3. The process for purifying a nitrogen trifluoride gas according to claim 1 wherein the shape of said metallic vessel is cylindrical.

4. The process for purifying a nitrogen trifluoride gas according to claim 1 wherein said process comprises the steps of heating said nitrogen trifluoride gas diluted with an inert gas in said vessel; allowing said gas coming through said vessel to bubble in an aqueous solution of at least one compound selected from the group consisting of KI, HI, $Na_2S$, $Na_2S_2O_3$ and $Na_2SO_3$; gradually cooling said gas and collecting it in a collector container; and after the stop of the feed of said nitrogen trifluoride, evacuating said collector container under vacuum so as to remove said inert gas therefrom.

5. A process for purifying a nitrogen trifluoride gas, comprising packing a metallic vessel with a formed solid fluoride, the whole inner wall of the metallic vessel having been previously lined with a compressed mold, a sintered mold or a fused mold of a solid fluoride in order to from a packing layer in said vessel, the packing solid fluoride and the inner wall solid fluoride each being at least one component selected from the group consisting of fluorides of metals in groups IA, IIA and IIIA of the periodic table, mixtures thereof and double salts thereof, the compressed mold, the sintered mold or the fused mold having a thickness of 1 to 5 mm, and then heating said nitrogen trifluoride gas containing at least dinitrogen difluoride as an impurity at a temperature of 150° to 600° C. in said packing layer of said solid fluoride.

6. The process for purifying a nitrogen trifluoride gas according to claim 5 wherein said solid fluoride used to line the inner wall of said vessel and said solid fluoride comprising said packing layer are each at least one compound selected from the group consisting of lithium fluoride (LiF), sodium fluoride (NaF), potassium fluoride (KF), rubidium fluoride (RbF), cesium fluoride (CsF), beryllium fluoride ($BeF_2$), magnesium fluoride ($MgF_2$), calcium fluoride ($CaF_2$), strontium fluoride ($SrF_2$), barium fluoride ($BaF_2$), aluminum fluoride ($AlF_3$), gallium fluoride ($GaF_3$), indium fluoride ($InF_3$) and aluminum sodium fluoride ($Na_3AlF_6$).

7. The process for purifying a nitrogen trifluoride gas according to claim 5 wherein the shape of said metallic vessel is cylindrical.

8. The process for purifying a nitrogen trifluoride gas according to claim 5 wherein said process comprises the steps of heating said nitrogen trifluoride gas diluted with an inert gas in said vessel; allowing said gas coming through said vessel to bubble in an aqueous solution of at least one compound selected from the group consisting of KI, HI, $Na_2S$, $Na_2S_2O_3$ and $Na_2SO_3$; gradually cooling said gas and collecting it in a collector container; and after the stop of the feed of said nitrogen trifluoride, evacuating said collector container under vacuum so as to remove said inert gas therefrom.

* * * * *